USO12075381B2

(12) United States Patent
Sekar et al.

(10) Patent No.: US 12,075,381 B2
(45) Date of Patent: Aug. 27, 2024

(54) SYSTEM MEMORY FLOW MANAGEMENT

(71) Applicant: QUALCOMM Incorporated, San Diego, CA (US)

(72) Inventors: Sivashankar Sekar, Hyderabad (IN); Saket Bathwal, Hyderabad (IN); Liangchi Hsu, San Diego, CA (US); Raghuveer Ramakrishna Srinivas Tarimala, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 381 days.

(21) Appl. No.: 17/095,344

(22) Filed: Nov. 11, 2020

(65) Prior Publication Data

US 2021/0153159 A1 May 20, 2021

Related U.S. Application Data

(60) Provisional application No. 62/936,028, filed on Nov. 15, 2019.

(51) Int. Cl.
*H04W 64/00* (2009.01)
*H04W 74/00* (2009.01)
*H04W 74/08* (2024.01)
*H04W 84/18* (2009.01)

(52) U.S. Cl.
CPC ....... *H04W 64/003* (2013.01); *H04W 74/002* (2013.01); *H04W 74/0866* (2013.01); *H04W 84/18* (2013.01)

(58) Field of Classification Search
USPC ....................................................... 370/329
See application file for complete search history.

(56) References Cited

U.S. PATENT DOCUMENTS

2004/0009779 A1\* 1/2004 Qu .......................... H04W 4/14
455/445
2005/0078651 A1\* 4/2005 Lee ......................... H04L 47/10
370/349
(Continued)

FOREIGN PATENT DOCUMENTS

CN 109474688 A 3/2019
CN 109597771 A 4/2019
(Continued)

OTHER PUBLICATIONS

International Search Report and Written Opinion—PCT/US2020/060141—ISA/EPO—Feb. 16, 2021.

*Primary Examiner* — Gary Mui
*Assistant Examiner* — Hooman Houshmand
(74) *Attorney, Agent, or Firm* — QUALCOMM Incorporated

(57) ABSTRACT

Methods, systems, and devices for wireless communications are described. A communication device, otherwise known as a user equipment (UE) may transmit a data transmission to a receiver. In some examples, the data transmission may be a radio link control (RLC) protocol data unit (PDU) transmission. The UE may store the data transmission in a retransmission buffer, and transmit a feedback request to the receiver in a subsequent data transmission based on a system memory utilization threshold for the retransmission buffer being satisfied due to storage of the data transmission.

27 Claims, 11 Drawing Sheets

(56) References Cited

U.S. PATENT DOCUMENTS

| | | | |
|---|---|---|---|
| 2008/0298242 A1* | 12/2008 | Fan | H04L 47/22 370/235 |
| 2009/0100170 A1* | 4/2009 | Schneider | H04L 47/12 709/224 |
| 2014/0219236 A1* | 8/2014 | Uchino | H04L 1/1874 370/329 |
| 2014/0286316 A1* | 9/2014 | Park | H04W 76/16 370/332 |
| 2018/0146391 A1* | 5/2018 | Bergquist | H04W 24/10 |
| 2018/0367463 A1* | 12/2018 | Jose | H04L 47/32 |
| 2020/0177318 A1* | 6/2020 | Belleschi | H04W 24/08 |

FOREIGN PATENT DOCUMENTS

| | | |
|---|---|---|
| EP | 3435576 A1 | 1/2019 |
| KR | 20050092606 A | 9/2005 |

* cited by examiner

SYSTEM MEMORY FLOW MANAGEMENT

CROSS REFERENCE

The present Application for Patent claims the benefit of U.S. Provisional Patent Application No. 62/936,028 by Sekar et al., entitled "SYSTEM MEMORY FLOW MANAGEMENT," filed Nov. 15, 2019, assigned to the assignee hereof, and expressly incorporated by reference in its entirety herein.

FIELD OF TECHNOLOGY

The following relates generally to wireless communications and more specifically to system memory flow management.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipments (UEs). Some wireless communications systems may support high reliability and low latency communications by storing communications in a memory buffer. Some wireless communications systems may also support various memory management techniques to support the high reliability and low latency communications. As demand for communication efficiency increases, some wireless communications systems may fail to provide satisfactory memory management techniques, and thereby may be unable to support high reliability and low latency communications, among other examples. Improved techniques are therefore desired.

SUMMARY

The described techniques may relate to configuring a communication device, which may be a UE, to support system memory flow management. The communication device may be configured, in some examples, to store a data transmission (e.g., a radio link control (RLC) protocol data unit (PDU)) in a buffer. A buffer may be a region of physical memory storage used to temporarily store data transmissions. In some examples, the communication device may be configured to transmit a feedback request in a subsequent data transmission based on a system memory utilization threshold for the buffer being satisfied due to storage of the data transmission. In some examples, the system memory utilization threshold may be less than a preconfigured window size for the retransmission buffer. As such, the communication device may be configured to store an RLC PDU transmission in a buffer until receiving a feedback response indicating a successful reception of the data transmission. The described techniques may therefore configure the communication device to support high reliability and low latency communications, among other examples, in accordance with a configured system memory flow management. The described techniques may include features for improvements to power consumption and, in some examples, may promote effective memory utilization for high reliability and low latency operations, among other benefits.

A method of wireless communications by a UE is described. The method may include transmitting, by the UE, a data transmission to a receiver, storing the data transmission in a retransmission buffer, and transmitting a feedback request to the receiver in a subsequent data transmission based on a system memory utilization threshold for the retransmission buffer being satisfied due to storage of the data transmission.

An apparatus for wireless communications is described. The apparatus may include a processor, memory coupled with the processor, and instructions stored in the memory. The instructions may be executable by the processor to cause the apparatus to transmit, by the apparatus, a data transmission to a receiver, store the data transmission in a retransmission buffer, and transmit a feedback request to the receiver in a subsequent data transmission based on a system memory utilization threshold for the retransmission buffer being satisfied due to storage of the data transmission.

Another apparatus for wireless communications is described. The apparatus may include means for transmitting, by the apparatus, a data transmission to a receiver, storing the data transmission in a retransmission buffer, and transmitting a feedback request to the receiver in a subsequent data transmission based on a system memory utilization threshold for the retransmission buffer being satisfied due to storage of the data transmission.

A non-transitory computer-readable medium storing code for wireless communications by a UE is described. The code may include instructions executable by a processor to transmit, by the UE, a data transmission to a receiver, store the data transmission in a retransmission buffer, and transmit a feedback request to the receiver in a subsequent data transmission based on a system memory utilization threshold for the retransmission buffer being satisfied due to storage of the data transmission.

In some examples of the method, apparatuses, and non-transitory computer-readable medium described herein, transmitting the feedback request may include operations, features, means, or instructions for transmitting the subsequent data transmission that includes a poll bit set to a defined value to indicate the feedback request.

In some examples of the method, apparatuses, and non-transitory computer-readable medium described herein, transmitting the data transmission may include operations, features, means, or instructions for transmitting the data transmission via a first radio access technology of the UE, where the feedback request may be transmitted to the receiver via the first radio access technology.

Some examples of the method, apparatuses, and non-transitory computer-readable medium described herein may further include operations, features, means, or instructions for transmitting a low system memory indication to a second radio access technology of the UE based on the system memory utilization threshold for the buffer being satisfied, and transmitting, via the second radio access technology, a second feedback request to the receiver or a second receiver in a second subsequent data transmission based on the low system memory indication.

Some examples of the method, apparatuses, and non-transitory computer-readable medium described herein may further include operations, features, means, or instructions for monitoring for a feedback response from the receiver corresponding to the data transmission based on transmitting the feedback request.

In some examples of the method, apparatuses, and non-transitory computer-readable medium described herein, the monitoring further may include operations, features, means, or instructions for receiving the feedback response from the receiver, and retransmitting the data transmission to the receiver based on the feedback response.

In some examples of the method, apparatuses, and non-transitory computer-readable medium described herein, the monitoring further may include operations, features, means, or instructions for receiving the feedback response from the receiver, and removing the data transmission from the retransmission buffer based on the feedback response.

Some examples of the method, apparatuses, and non-transitory computer-readable medium described herein may further include operations, features, means, or instructions for determining not to transmit a second feedback request to the receiver in a second subsequent data transmission based on the system memory utilization threshold for the retransmission buffer not being satisfied due to removal of the data transmission from the retransmission buffer.

In some examples of the method, apparatuses, and non-transitory computer-readable medium described herein, determining not to transmit the second feedback request may include operations, features, means, or instructions for determining not to transmit the second feedback request in the second subsequent data transmission based on a system memory availability threshold for the retransmission buffer being satisfied due to removal of the data transmission from the retransmission buffer.

In some examples of the method, apparatuses, and non-transitory computer-readable medium described herein, the monitoring further may include operations, features, means, or instructions for retransmitting the data transmission to the receiver based on determining that the feedback response may be not received within a time period.

In some examples of the method, apparatuses, and non-transitory computer-readable medium described herein, the feedback response indicates that the receiver successfully received the data transmission or did not successfully receive the data transmission.

In some examples of the method, apparatuses, and non-transitory computer-readable medium described herein, the system memory utilization threshold may be less than a preconfigured window size for the retransmission buffer.

In some examples of the method, apparatuses, and non-transitory computer-readable medium described herein, an acknowledgement window size for a transmitter entity of the UE may be based on an available memory budget of the UE.

Some examples of the method, apparatuses, and non-transitory computer-readable medium described herein may further include operations, features, means, or instructions for dynamically scaling up or down, by the transmitter entity of the UE, the acknowledgement window size based on memory usage by the UE.

In some examples of the method, apparatuses, and non-transitory computer-readable medium described herein, the system memory utilization threshold may be less than the acknowledgement window size.

In some examples of the method, apparatuses, and non-transitory computer-readable medium described herein, the data transmission may be an RLC PDU transmission.

DETAILED DESCRIPTION

Figure 1:
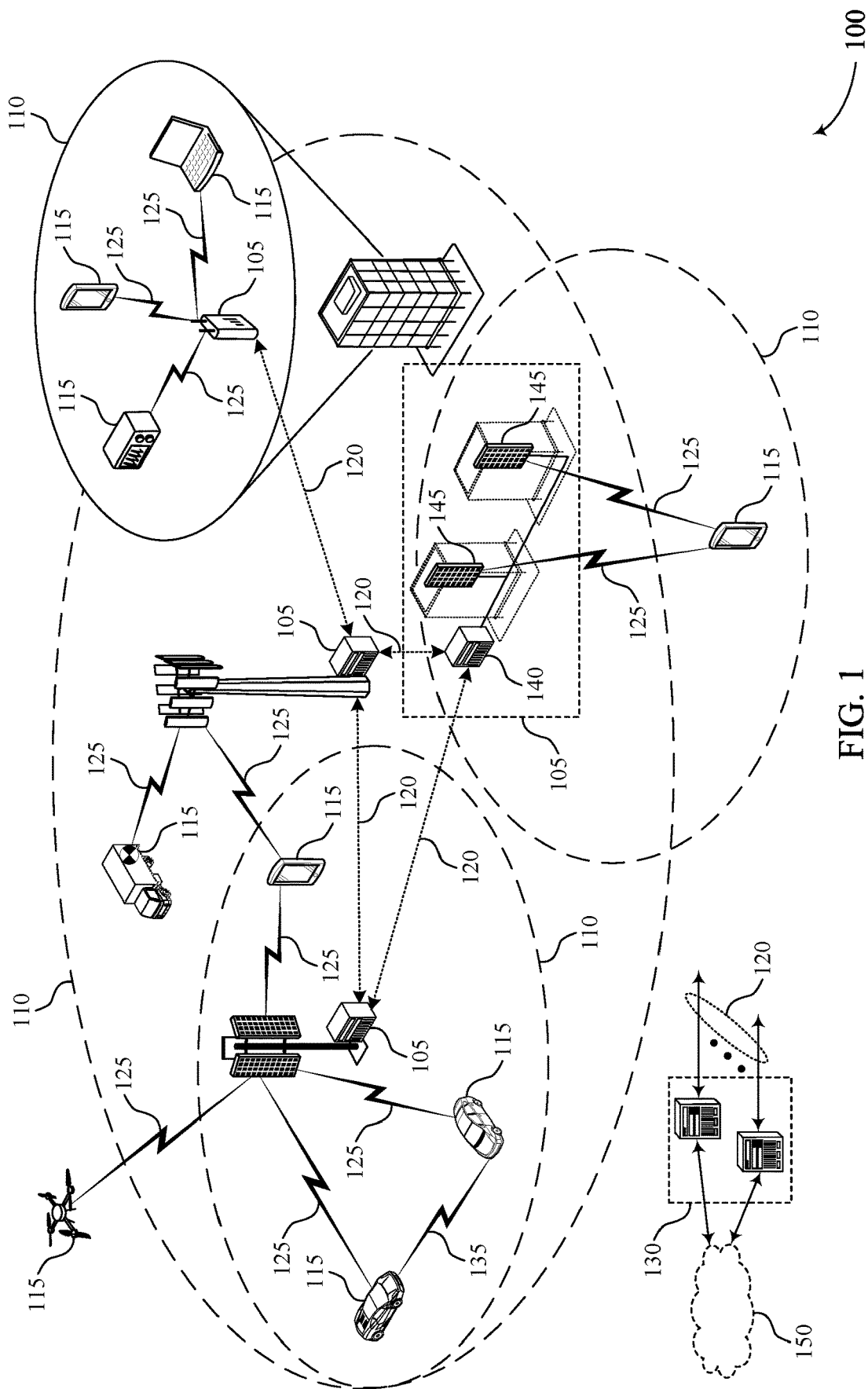
FIG. 1 illustrates an example of a wireless communications system that supports system memory flow management in accordance with aspects of the present disclosure.

Some wireless communication systems may include one or more communication devices, such as UEs and base stations, for example, next-generation NodeBs or giga-NodeBs (either of which may be referred to as a gNB) that may support multiple radio access technologies including 4G systems such as LTE systems, 5G systems which may be referred to as NR systems. In some examples, the one or more communication devices may correspond to one or more categories. For example, the one or more communication devices may be a category M (CAT-M) communication device, an LTE category zero (LTE CAT-0) communication device, or a narrowband Internet of things IoT (NB-IoT) communication devices, among others. The one or more communication devices may, in some examples, support high reliability and low latency communications related to the above example radio access technologies. Some examples of the one or more communication devices may also support system memory flow management to experience effective memory utilization for both high memory footprint and low memory footprint communication devices.

The communication devices may, in some examples, support transfer (e.g., transmission, reception) of upper layer PDUs in one or more modes, which may include an acknowledged mode (AM), an unacknowledged mode (UM), and a transparent mode (TM). In the AM, the communication devices may maintain RLC PDUs in a buffer (also referred to as a transmission buffer or a retransmission buffer) in memory of the communication devices, in case of retransmission of the RLC PDUs. In some examples, the communication devices may store RLC PDUs in a buffer until receiving a feedback response (e.g., a positive acknowledgement, a negative acknowledgement). For example, a transmitter AM RLC entity may, based on transmitting an RLC PDU, store the RLC PDU in a buffer in memory until receiving a positive acknowledgement from a receiver entity. The positive acknowledgement may indicate that the receiver entity successfully received the data transmission, while a negative acknowledgement may indicate that the receiver entity did not successfully receive the data transmission.

In some examples, the communication devices may inquire about a status of previously-transmitted RLC PDUs that are stored in the buffer. For example, the communication devices (e.g., transmitter AM RLC entities) may enable one or more polling bits in an RLC data PDU upon assembling an AM mode data (AMD) PDU or an AMD PDU segment. The polling bits may indicate whether a transmitter AM RLC entity is requesting a receiver entity about the status of previously-transmitted RLC PDUs that are stored in the buffer. The polling bits may correspond to one or more of a number of AMD PDU or a number of bytes of AMD PDU data. The receiver entity may transmit the status of the previously-transmitted RLC PDUs to the transmitter AM RLC entity (e.g., a peer entity) when the polling is received. As a result, the transmitter AM RLC entity may, upon receiving the status of the previously-transmitted RLC PDUs with a positive acknowledgement, process the buffer and remove the buffer as it has been acknowledged.

In some examples, the communication devices may be unable to transmit new RLC PDUs due to a preconfigured window size for the retransmission buffer (also referred to as window stalling). For example, the preconfigured window size for the retransmission buffer may be 512 (e.g., an AM_Window_Size=512) when a 10 bit sequence number (SN) is used, the preconfigured window size for the retransmission buffer may be 32,768 (e.g., an AM_Window_Size=32,768) when a 16 bit SN is used. The number of RLC PDUs sitting in a transmission window may thus vary, and based on the preconfigured window size, the communication devices may hold about 512 to 32,768 RLC PDUs which may result in a high memory hold usage. In some examples, if the communication devices have a high memory footprint, the communication devices may allocate memory from other active radio access technologies (e.g., GPS, Wi-Fi, etc.) and services, to be able to manage the new RLC PDUs. This could, however, result in the communication devices running out of memory to accommodate further new RLC PDUs within the window size. In other examples, if the communication devices have a lower memory footprint (e.g., CATM, LTE CAT0, NB-IoT system, etc.), the communication devices could experience memory outage before the preconfigured window size.

To address the above shortcomings, the described techniques may configure the communication devices to transmit a data transmission, store the data transmission in a retransmission buffer, and transmit a feedback request in a subsequent data transmission based on a system memory utilization threshold for the retransmission buffer being satisfied due to storage of the data transmission. The system memory utilization threshold may be less than a preconfigured window size for the retransmission buffer. In some examples, the described techniques may configure the communication devices to detect that system memory is reaching a lower threshold limit of available memory, and trigger underlying radio access technologies to perform a recovery mechanism (e.g., system memory flow management). The described techniques may, in some examples, configure the communication devices to transmit the data transmission via a first radio access technology, where the feedback request is transmitted to the receiver via the first radio access technology.

In some examples, the communication devices may transmit a low system memory indication to a second radio access technology based on the system memory utilization threshold for the buffer being satisfied, and transmit, via the second radio access technology, a second feedback request in a second subsequent data transmission based on the low system memory indication. The described techniques may, in some examples, configure the communication devices to transmit the subsequent data transmission that includes a poll bit set to a defined value to indicate the feedback request. For example, if the communication devices demand higher memory to be allocated for other radio access technologies or services and is not sufficient under the available memory, the communication devices may set a poll bit in the upcoming RLC PDU transmission. For example, upon indication to NR, LTE, LTE-CAT0, CATM, other RAT, or any combination thereof, that are under an RLC AM mode of operation, such one or more RATs may set a poll bit in one or more upcoming RLC PDU transmissions.

Particular aspects of the subject matter described in this disclosure may be implemented to realize one or more of the following potential advantages. The techniques employed by the described one or more communication devices may provide benefits and enhancements to the operation of the communication devices. For example, operations performed by the described one or more communication devices may provide improvements to system memory flow management. In some examples, the described one or more communication devices may support storing a radio link control PDU transmission in a retransmission buffer until receiving a feedback response indicating a successful reception of the data transmission. As a result, the described one or more communication devices may experience improvements to hardware, software, and firmware complexity, among other benefits. The described one or more communication devices may also experience effective memory utilization for low footprint memory systems by reducing memory usage for an RLC transmission window. Additionally, the techniques described herein may permit a wireless device to recover from a memory crunch, and may provide for effective memory utilization in a low footprint memory system.

Aspects of the disclosure are initially described in the context of wireless communications systems. Aspects of the disclosure are then illustrated by and described with reference to a process flow that relates to system memory flow management. Aspects of the disclosure are further illustrated by and described with reference to apparatus diagrams, system diagrams, and flowcharts that relate to system memory flow management in wireless communications systems.

FIG. 1 illustrates an example of a wireless communications system 100 that supports system memory flow management in accordance with aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples, the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or DFT-S-OFDM). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, NB-IoT, enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 MHz to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. An RLC layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

UEs 115 may transmit a data transmission to a receiver (e.g., other UEs 115 or base stations 105). The data transmission may be an RLC PDU transmission. The UEs 115 may store the data transmission in a retransmission buffer, and transmit a feedback request to the receiver (e.g., other UEs 115 or base stations 105) in a subsequent data transmission based on a system memory utilization threshold for the retransmission buffer being satisfied due to storage of the data transmission. The system memory utilization threshold may be less than a preconfigured window size for the retransmission buffer. In some examples, the UEs 115 may transmit the subsequent data transmission that includes a poll bit set to a defined value to indicate the feedback request.

The UEs 115 may monitor for a feedback response from the receiver (e.g., other UEs 115 or base stations 105) corresponding to the data transmission based on transmitting the feedback request. In some examples, the UEs 115 may retransmit the data transmission to the receiver (e.g., other UEs 115 or base stations 105) based on determining that the feedback response is not received within a time period. The feedback response may indicate that the receiver (e.g., other UEs 115 or base stations 105) successfully received the data transmission or did not successfully receive the data transmission.

In some examples, the UEs may receive the feedback response from the receiver (e.g., other UEs 115 or base stations 105), and retransmit the data transmission to the receiver (e.g., other UEs 115 or base stations 105) based on the feedback response. In some other examples, the UEs may receive the feedback response from the receiver (e.g., other UEs 115 or base stations 105), and remove the data transmission from the retransmission buffer based on the feedback response. In some examples, the UEs 115 may determine not to transmit a second feedback request to the receiver (e.g., other UEs 115 or base stations 105) in a second subsequent data transmission based on the system memory utilization threshold for the retransmission buffer not being satisfied due to removal of the data transmission from the retransmission buffer. For example, the UEs 115 may determine not to transmit the second feedback request in the second subsequent data transmission based on a system memory availability threshold for the retransmission buffer being satisfied due to removal of the data transmission from the retransmission buffer.

Figure 2:
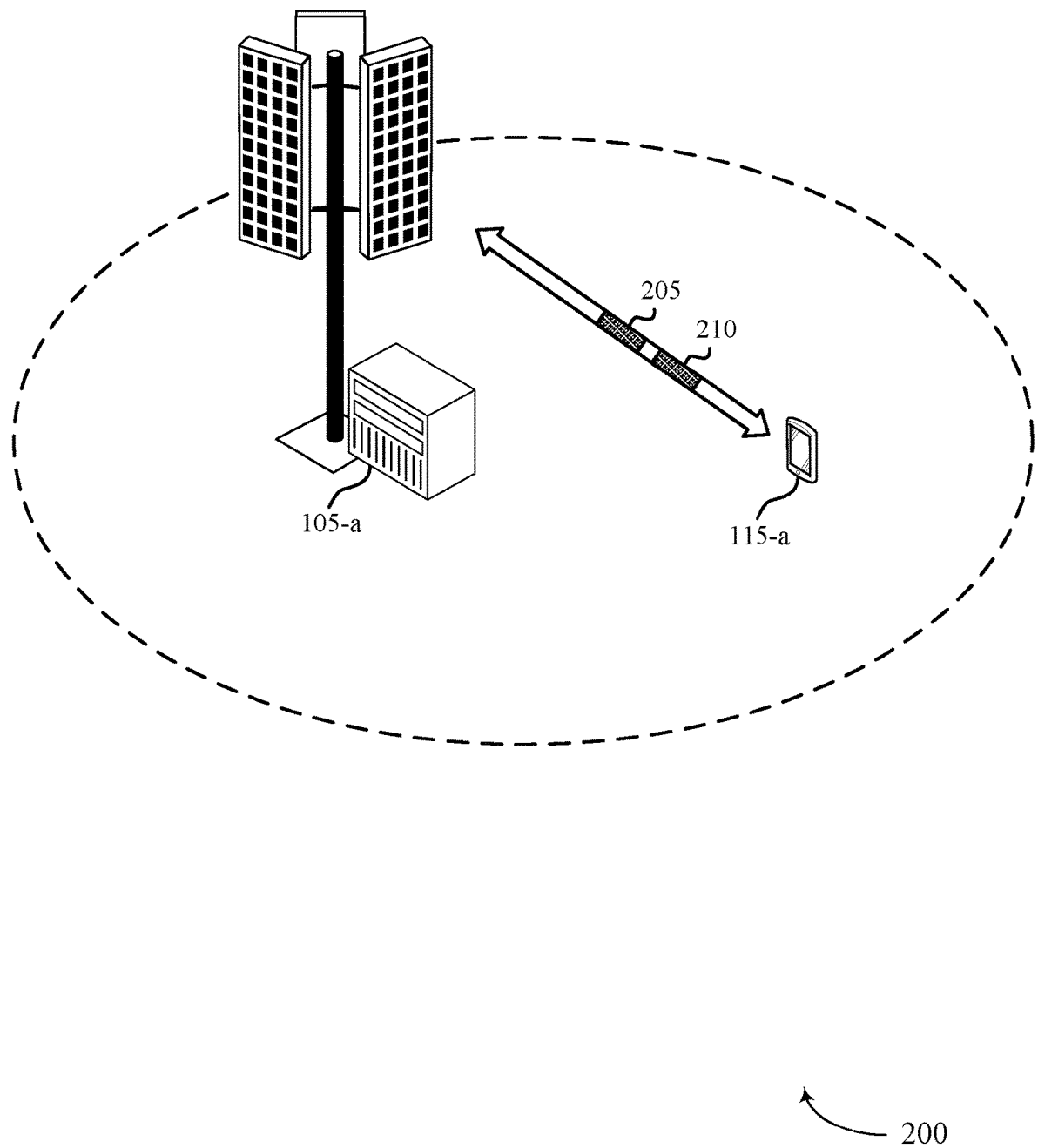
FIG. 2 illustrates an example of a wireless communications system that supports system memory flow management, where a user equipment (UE) and a base station may communicate one or more transmissions based on system memory flow management in accordance with aspects of the present disclosure.

FIG. 2 illustrates an example of a wireless communications system 200 that supports system memory flow management in accordance with aspects of the present disclosure. The wireless communications system 200 may include a base station 105-a and a UE 115-a, which may be examples of the corresponding devices described with reference to FIG. 1. In some examples, the wireless communications system 200 may implement aspects of the wireless communications system 100. For example, the base station 105-a and the UE 115-a in the wireless communications system 200 may support system memory flow management. As a result, the base station 105-a and the UE 115-a may support improvements to power consumption, reduced memory usage, effective memory utilization and, in some examples, may promote enhanced efficiency for high reliability and low latency operations, among other benefits.

In some examples, the base station 105-a and the UE 115-a may support multiple radio access technologies including 4G systems such as LTE systems, 5G systems which may be referred to as NR systems, among others. The base station 105-a may support downlink transmission and the UE 115-a may support downlink reception in accordance with one or more radio access technologies. In complement, the UE 115-a may support uplink transmission and the base station 105-a may support uplink reception in accordance with one or more radio access technologies. For example, the UE 115-a may transmit a data transmission 205 to the base station 105-a on one or more physical uplink channels. The one or more physical uplink channels may include one or more of a physical uplink control channel (PUCCH) or a physical uplink shared channel (PUSCH). The data transmission 205 may include one or more RLC PDUs. In some examples, one or more of the base station 105-a or the UE 115-a may be configured with multiple RLC entities to support data transmission (e.g., RLC PDUs) according to multiple radio access technologies. For example, one or more of the base station 105-a or the UE 115-a may be configured with a separate RLC entity for each supported radio access technology.

The UE 115-a may store the data transmission 205 in a retransmission buffer. For example, the UE 115-a may store an RLC PDU in a retransmission buffer in a memory of the UE 115-a. In some examples, the retransmission buffer may include a region of a physical memory storage used to temporarily store data transmissions. The memory may include a cache memory, a random-access memory (RAM), a read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store data transmissions.

The UE 115-a may transmit a subsequent data transmission 210 to the base station 105-a. The subsequent data transmission 210 may carry a feedback request for the base station 105-a. In some examples, the UE 115-a may transmit the subsequent data transmission 210 to the base station 105-a based on a system memory utilization threshold for the retransmission buffer being satisfied due to storage of the data transmission 205. The system memory utilization threshold may be less than a preconfigured window size for the retransmission buffer. A window size may be based on an available budget of the UE 115-a. In some examples, the UE 115-a may dynamically scale up or down the window size (e.g., an acknowledgement window size) based on memory usage by the UE 115-a. For example, a transmitter entity can have a predefined acknowledgement window size based on the memory budget available in the UE 115-a. Thus, the transmitter entity can dynamically scale up and down the window size base on a memory usage in the UE 115-a. In some examples, the system memory utilization threshold may be less than the acknowledgement window size. In some examples, because the UE 115-a may support multiple radio access technologies, the UE 115-a may transmit the data transmission 205 via a first radio access technology (e.g., LTE, NR) of the UE 115-a. Thus, the feedback request may be transmitted to the base station 105-a via the first radio access technology.

In some examples, the UE 115-a may transmit a low system memory indication to a second radio access technology (e.g., LTE, NR) of the UE 115-a based on the system memory utilization threshold for the buffer being satisfied. The UE 115-a may transmit, via the second radio access technology, a second feedback request to the base station 105-a in a second subsequent data transmission based on the low system memory indication. For example, a first RLC entity of the UE 115-a corresponding to a first radio access technology may signal a low system memory indication to a second RLC entity of the UE 115-a corresponding to a second radio access technology.

The UE 115-a may monitor for a feedback response from the base station 105-a, for example, by monitoring one or more physical downlink channels. The one or more physical downlink channels may include one or more of a physical downlink control channel (PDCCH), a physical downlink shared channel (PDSCH) or a synchronization signal physical broadcast channel (SS/PBCH) block. In some examples, the base station 105-a may transmit the feedback response to the UE 115-a. In some examples, the UE 115-a may monitor for the feedback response from the base station 105-a corresponding to the data transmission 205 based on transmitting the feedback request. In some examples, the UE 115-a may receive the feedback response from the base station 105-a, and remove the data transmission 205 from the retransmission buffer based part on the feedback response. In some other examples, the UE 115-a may receive the feedback response from the base station 105-a and retransmit the data transmission 205 to the base station 105-a based on the feedback response. In other examples, the UE 115-a may retransmit the data transmission 205 to the base station 105-a based on determining that the feedback response is not received within a time period satisfying a threshold period.

The base station 105-a and the UE 115-a, as part of, the wireless communications system 200 may provide improvements to memory flow management procedures. Further, the operations performed by the base station 105-*a* and the UE 115-*a* may provide benefits and enhancements to the operation of the UE 115-*a*. For example, the described memory flow management in the wireless communications system 200 may support reduced power consumption, decreased memory usage, among other advantages.

Figure 3:
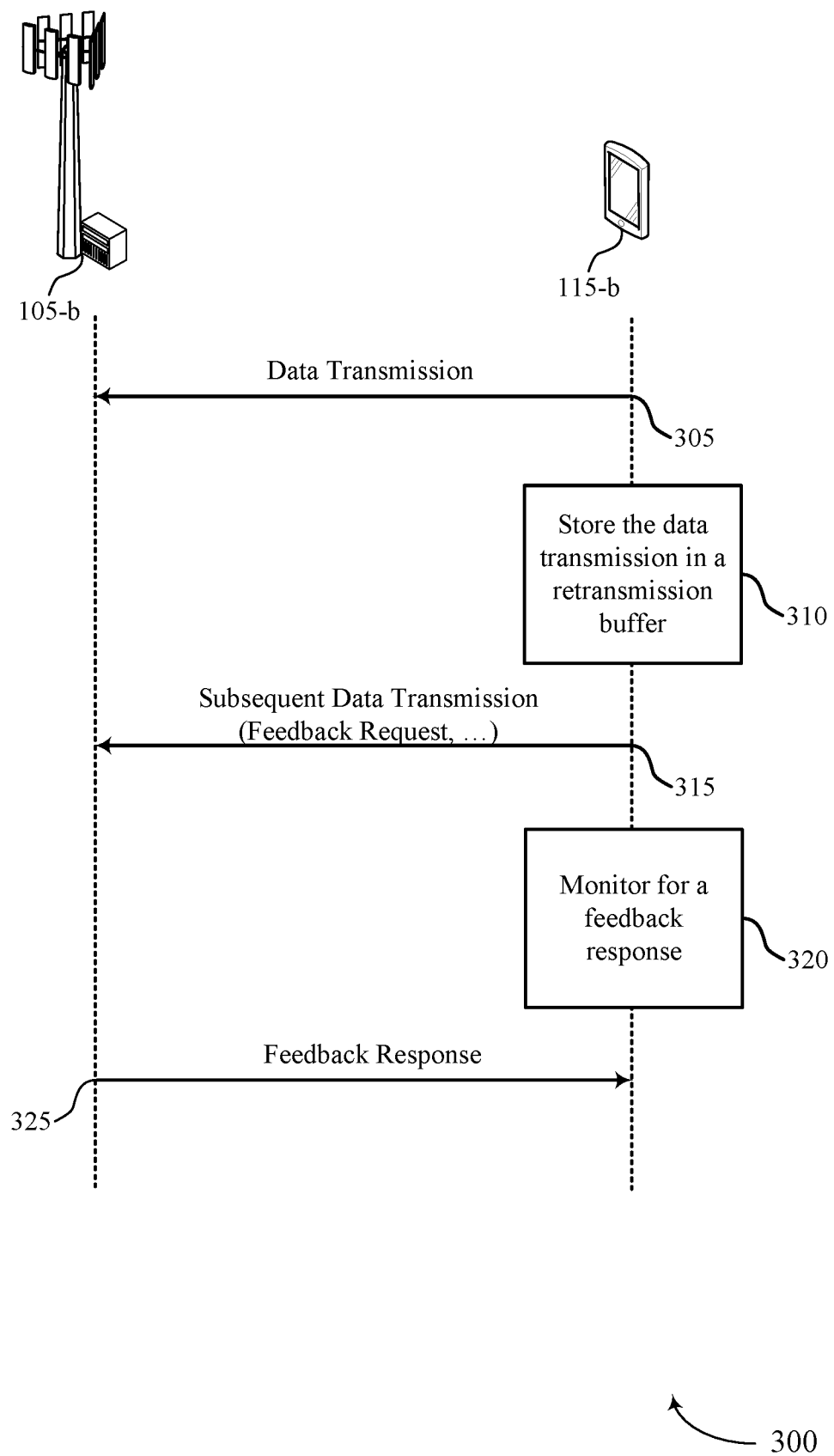
FIG. 3 illustrates an example of a process flow including one or more operations performed by a UE and a base station that supports system memory flow management in accordance with aspects of the present disclosure.

FIG. 3 illustrates an example of a process flow 300 that supports system memory flow management in accordance with aspects of the present disclosure. The process flow 300 may implement aspects of the wireless communications system 100 and 200 described with reference to FIGS. 1 and 2, respectively. For example, the process flow 300 may be based on a configuration by a base station 105-*b* or a UE 115-*b*, and implemented by the UE 115-*b* for reduced power consumption, improved memory utilization, and may promote low latency for wireless communications, among other benefits. The base station 105-*b* and the UE 115-*b* may be examples of a base station 105 and a UE 115, as described with reference to FIGS. 1 and 2. In the following description of the process flow 300, the operations between the base station 105-*b* and the UE 115-*b* may be transmitted in a different order than the example order shown, or the operations performed by the base station 105-*b* and the UE 115-*b* may be performed in different orders or at different times. Some operations may also be omitted from the process flow 300, and other operations may be added to the process flow 300.

At 305, the UE 115-*b* may transmit a data transmission to the base station 105-*b*. For example, the UE 115-*b* may transmit an RLC PDU to the base station 105-*b*. At 310, the UE 115-*b* may store the data transmission in a retransmission buffer. For example, the UE 115-*b* may store an RLC PDU in a retransmission buffer in a memory of the UE 115-*b*. The memory may include a cache memory, a RAM, a ROM, or any other non-transitory medium that may be used to carry or store data transmissions. At 315, the UE 115-*b* may transmit a subsequent data transmission to the base station 105-*b*. The subsequent data transmission may carry a feedback request for the base station 105-*b*. In some examples, the UE 115-*b* may transmit the subsequent data transmission to the base station 105-*b* based on a system memory utilization threshold for the retransmission buffer being satisfied due to storage of the data transmission. The system memory utilization threshold may be less than a preconfigured window size for the retransmission buffer.

In some examples, the UE 115-*b* may support multiple radio access technologies including 4G systems such as LTE systems, 5G systems which may be referred to as NR systems, among others. The UE 115-*b* may thus, in some examples, transmit the data transmission via a first radio access technology of the UE 115-*b*, where the feedback request is transmitted to the base station 105-*b* via the first radio access technology. In some examples, the UE 115-*b* may transmit a low system memory indication to a second radio access technology of the UE 115-*b* based on the system memory utilization threshold for the buffer being satisfied. The UE 115-*b* may transmit, via the second radio access technology, a second feedback request to the base station 105-*b* or a second receiver in a second subsequent data transmission based on the low system memory indication.

At 320, the UE 115-*b* may monitor for a feedback response from the base station 105-*b*, and at 325 the base station 105-*b* may transmit the feedback response to the UE 115-*b*. In some examples, the UE 115-*b* may monitor for the feedback response from the base station 105-*b* corresponding to the data transmission based on transmitting the feedback request. In some examples, the UE 115-*b* may receive the feedback response from the base station 105-*b*, and remove the data transmission from the retransmission buffer based part on the feedback response. In some other examples, the UE 115-*b* may receive the feedback response from the base station 105-*b* and retransmit the data transmission to the base station 105-*b* based on the feedback response. In other examples, the UE 115-*b* may retransmit the data transmission to the base station 105-*b* based on determining that the feedback response is not received within a time period satisfying a threshold period.

The operations performed by the base station 105-*b* and the UE 115-*b* as part of, but not limited to, process flow 300 may provide improvements to UE 115-*b* memory flow management procedures. Further, the operations performed by the base station 105-*b* and the UE 115-*b* as part of, but not limited to, process flow 300 may provide benefits and enhancements to the operation of the UE 115-*b*. For example, the described memory flow management in the process flow 300 may support reduced power consumption, decreased memory usage, among other advantages.

Figure 4:
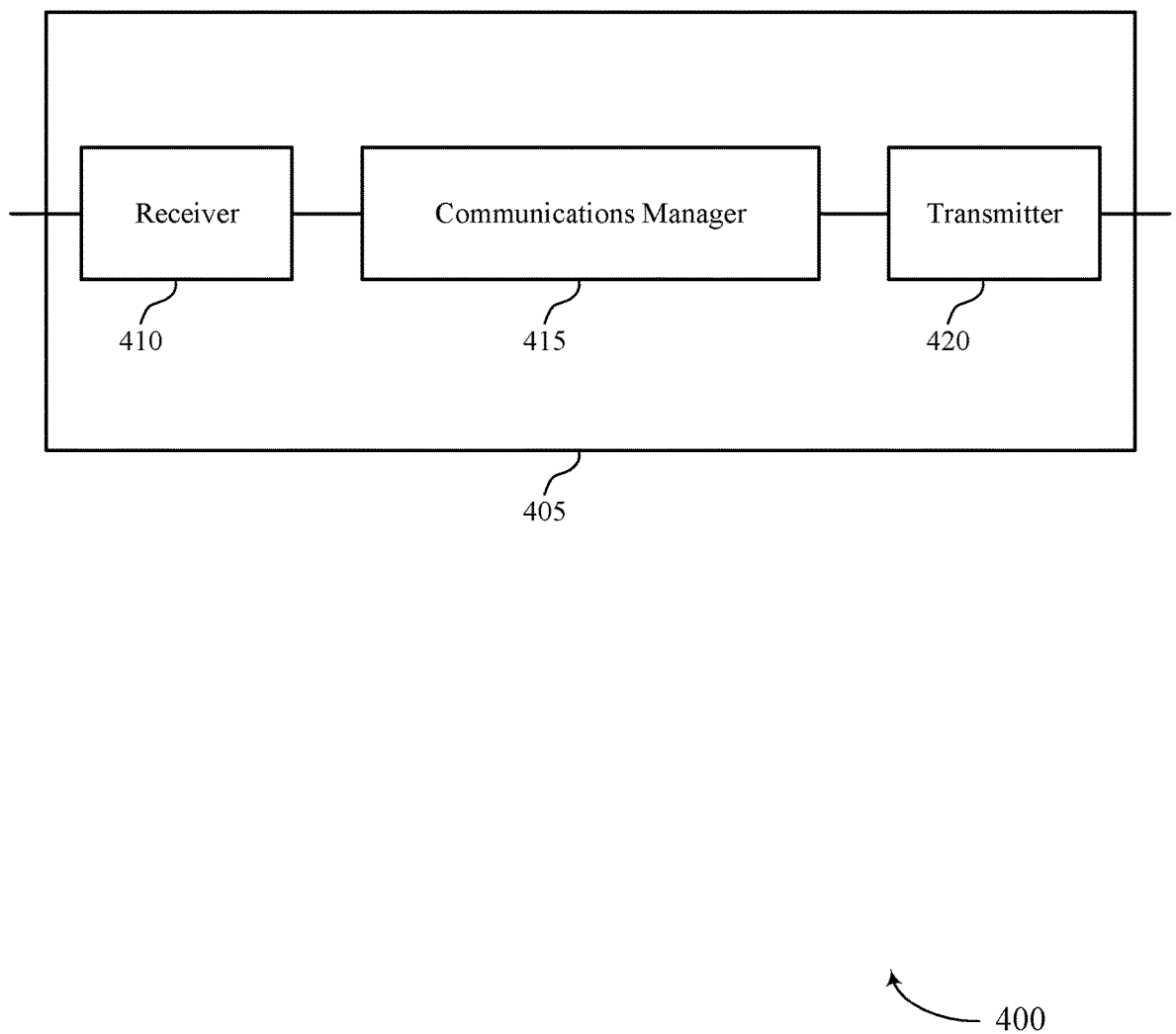
FIG. 4 shows a diagram of a device that includes a receiver, a communications manager, and a transmitter, and supports system memory flow management in accordance with aspects of the present disclosure.

FIG. 4 shows a diagram 400 of a device 405 that supports system memory flow management in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to system memory flow management, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may transmit, by the device 405, a data transmission to a receiver, store the data transmission in a retransmission buffer, and transmit a feedback request to the receiver in a subsequent data transmission based on a system memory utilization threshold for the retransmission buffer being satisfied due to storage of the data transmission. The communications manager 415 may be an example of aspects of the communications manager 710 described herein.

The actions performed by the communications manager 415 as described herein may be implemented to realize one or more potential advantages. One implementation may allow a UE 115 to provide improvements to system memory flow management. Additionally or alternatively, the UE 115 may support storing a radio link control PDU transmission in a retransmission buffer until receiving a feedback response indicating a successful reception of the data transmission. Another implementation may permit a wireless device to recover from a memory crunch, and may provide for effective memory utilization in a low footprint memory system.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
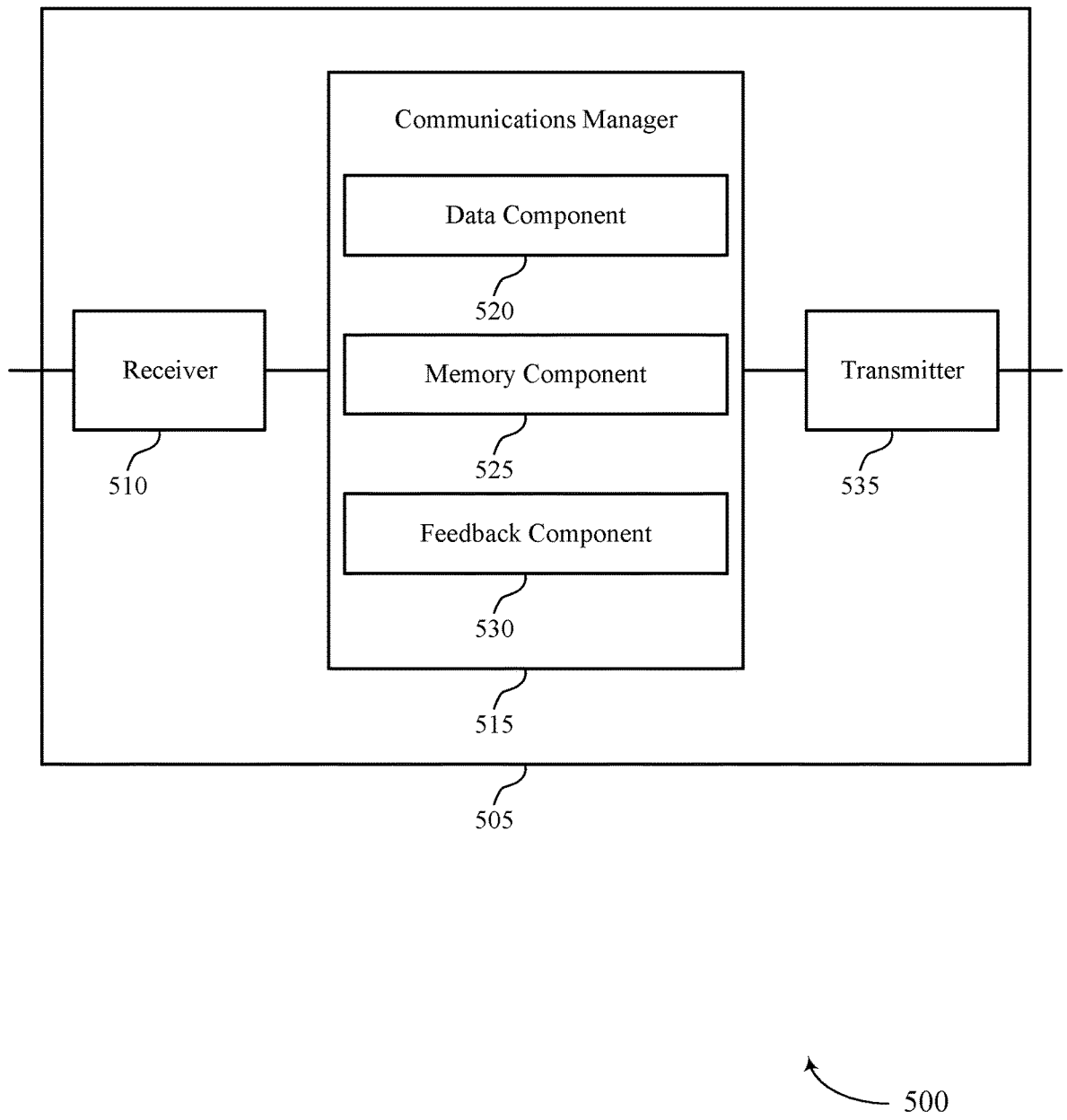
FIG. 5 shows a diagram of a device that includes a receiver, a communications manager, and a transmitter, and supports system memory flow management in accordance with aspects of the present disclosure, where the communications manager further includes a data component, a memory component, and a feedback component.

FIG. 5 shows a diagram 500 of a device 505 that supports system memory flow management in accordance with aspects of the present disclosure. The device 505 may be an example of aspects of a device 405, or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to system memory flow management, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a data component 520, a memory component 525, and a feedback component 530. The communications manager 515 may be an example of aspects of the communications manager 710 described herein.

The data component 520 may transmit, by the device 505, a data transmission to a receiver. The memory component 525 may store the data transmission in a retransmission buffer. The feedback component 530 may transmit a feedback request to the receiver in a subsequent data transmission based on a system memory utilization threshold for the retransmission buffer being satisfied due to storage of the data transmission.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
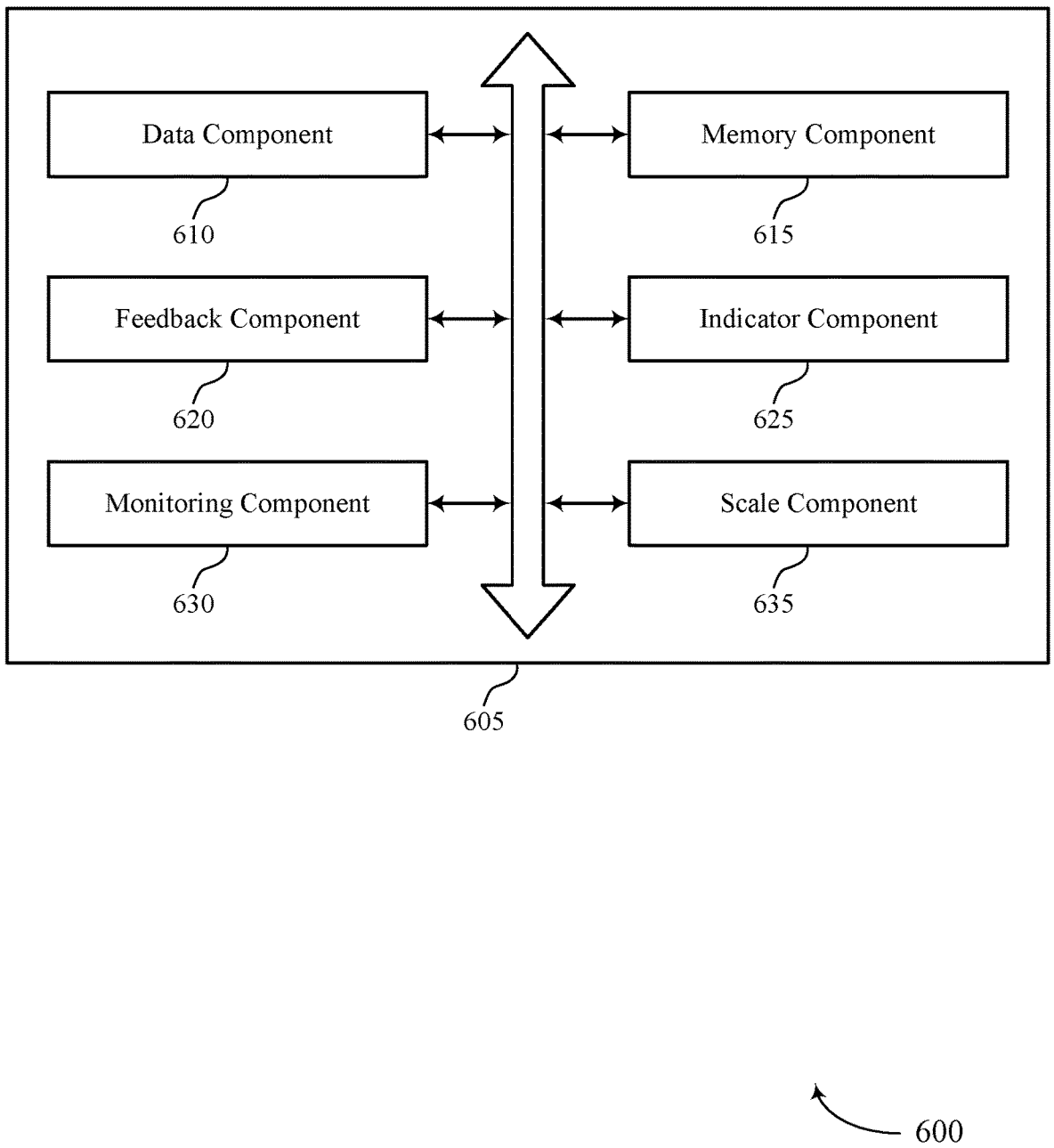
FIG. 6 shows a diagram of a communications manager that supports system memory flow management in accordance with aspects of the present disclosure.

FIG. 6 shows a diagram 600 of a communications manager 605 that supports system memory flow management in accordance with aspects of the present disclosure. The communications manager 605 may be an example of aspects of a communications manager 415, a communications manager 515, or a communications manager 710 described herein. The communications manager 605 may include a data component 610, a memory component 615, a feedback component 620, an indicator component 625, a monitoring component 630, and a scale component 635. Each of these modules may communicate, directly or indirectly, with one another (e.g., via one or more buses).

The data component 610 may transmit, by a UE, a data transmission to a receiver. In some examples, the data component 610 may transmit the data transmission via a first radio access technology of the UE, where a feedback request is transmitted to the receiver via the first radio access technology. In some examples, the data component 610 may transmit a subsequent data transmission that includes a poll bit set to a defined value to indicate a feedback request. In some examples, the data component 610 may retransmit the data transmission to the receiver based on a feedback response. In some examples, the data component 610 may remove the data transmission from a retransmission buffer based on the feedback response. In some examples, the data component 610 may retransmit the data transmission to the receiver based on determining that the feedback response is not received within a time period. In some cases, the data transmission is an RLC PDU transmission.

The memory component 615 may store the data transmission in the retransmission buffer. In some cases, a system memory utilization threshold may be less than a preconfigured window size for the retransmission buffer. In some cases, an acknowledgement window size for a transmitter entity of the UE may be based on an available memory budget of the UE. In some cases, the system memory utilization threshold may be less than the acknowledgement window size.

The feedback component 620 may transmit the feedback request to the receiver in the subsequent data transmission based on the system memory utilization threshold for the retransmission buffer being satisfied due to storage of the data transmission. In some examples, the feedback component 620 may transmit, via a second radio access technology, a second feedback request to the receiver or a second receiver in a second subsequent data transmission based on the low system memory indication. In some examples, the feedback component 620 may receive the feedback response from the receiver. In some examples, the feedback component 620 may determine not to transmit a second feedback request to the receiver in a second subsequent data transmission based on the system memory utilization threshold for the retransmission buffer not being satisfied due to removal of the data transmission from the retransmission buffer. In some examples, the feedback component 620 may determine not to transmit the second feedback request in the second subsequent data transmission based on a system memory availability threshold for the retransmission buffer being satisfied due to removal of the data transmission from the retransmission buffer. In some cases, the feedback response indicates that the receiver successfully received the data transmission or did not successfully receive the data transmission.

The indicator component 625 may transmit the low system memory indication to the second radio access technology of the UE based on the system memory utilization threshold for the buffer being satisfied. The monitoring component 630 may monitor for the feedback response from the receiver corresponding to the data transmission based on transmitting the feedback request. The scale component 635 may dynamically scale up or down, by the transmitter entity of the UE, the acknowledgement window size based on memory usage by the UE.

Figure 7:
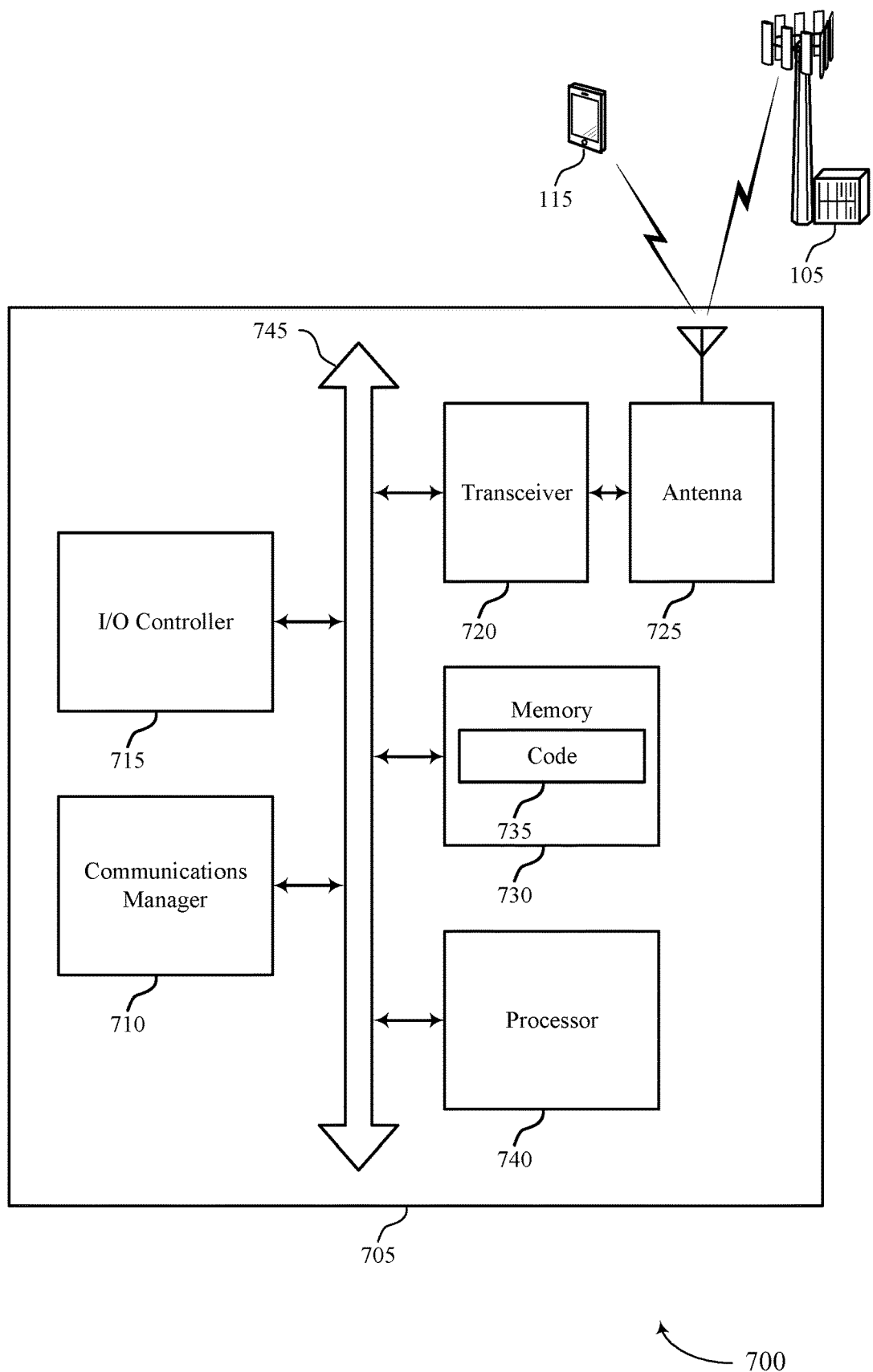
FIG. 7 shows a diagram of a system including a device that supports system memory flow management in accordance with aspects of the present disclosure.

FIG. 7 shows a diagram of a system 700 including a device 705 that supports system memory flow management in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may transmit, by the UE, a data transmission to a receiver, store the data transmission in a retransmission buffer, and transmit a feedback request to the receiver in a subsequent data transmission based on a system memory utilization threshold for the retransmission buffer being satisfied due to storage of the data transmission.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS, ANDROID, MS-DOS, MS-WINDOWS, OS/2, UNIX, LINUX, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas. In some cases, the device 705 may include a single antenna 725. However, in some cases, the device 705 may have more than one antenna 725, which may be capable of concurrently transmitting or receiving multiple wireless transmissions.

The memory 730 may include RAM and ROM. The memory 730 may store computer-readable, computer-executable code 735 including instructions that, when executed, cause the processor to perform various functions described herein. In some cases, the memory 730 may contain, among other things, a basic I/O system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting system memory flow management).

Based on storing a data transmission in a retransmission buffer, a processor of a UE 115 (e.g., controlling the receiver 510, the transmitter 535 as described with reference to FIG. 5, or the transceiver 720) may efficiently transmit a feedback request to the receiver in a subsequent data transmission based at least in part on a system memory utilization threshold for the retransmission buffer being satisfied due to storage of the data transmission. Further, the processor of UE 115 may transmit the subsequent data transmission that includes a poll bit set to a defined value to indicate the feedback request. The processor of the UE 115 may turn on one or more processing units for transmitting the subsequent data transmission, increase a processing clock, or a similar mechanism within the UE 115. As such, when the subsequent data transmission is transmitted, the processor may be ready to respond more efficiently through the reduction of a ramp up in processing power.

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
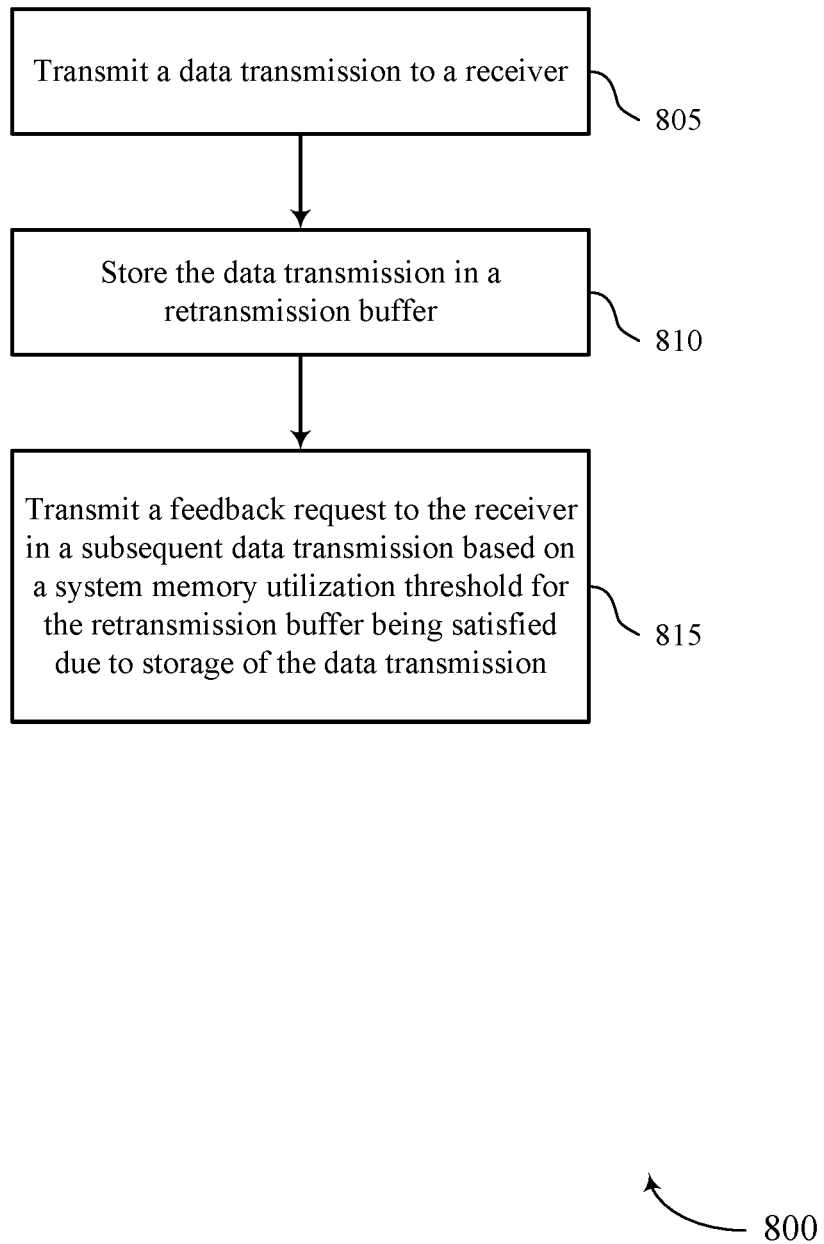
FIG. 8 shows a flowchart illustrating a method that supports system memory flow management, which includes transmitting a feedback request to a receiver device based on a system memory utilization threshold in accordance with aspects of the present disclosure.

FIG. 8 shows a flowchart illustrating a method 800 that supports system memory flow management in accordance with aspects of the present disclosure. The operations of method 800 may be implemented by a UE 115 or its components as described herein. For example, the operations of method 800 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 805, the UE may transmit a data transmission to a receiver. The operations of 805 may be performed according to the methods described herein. In some examples, aspects of the operations of 805 may be performed by a data component as described with reference to FIGS. 4 through 7.

At 810, the UE may store the data transmission in a retransmission buffer. The operations of 810 may be performed according to the methods described herein. In some examples, aspects of the operations of 810 may be performed by a memory component as described with reference to FIGS. 4 through 7.

At 815, the UE may transmit a feedback request to the receiver in a subsequent data transmission based on a system memory utilization threshold for the retransmission buffer being satisfied due to storage of the data transmission. The operations of 815 may be performed according to the methods described herein. In some examples, aspects of the operations of 815 may be performed by a feedback component as described with reference to FIGS. 4 through 7.

Figure 9:
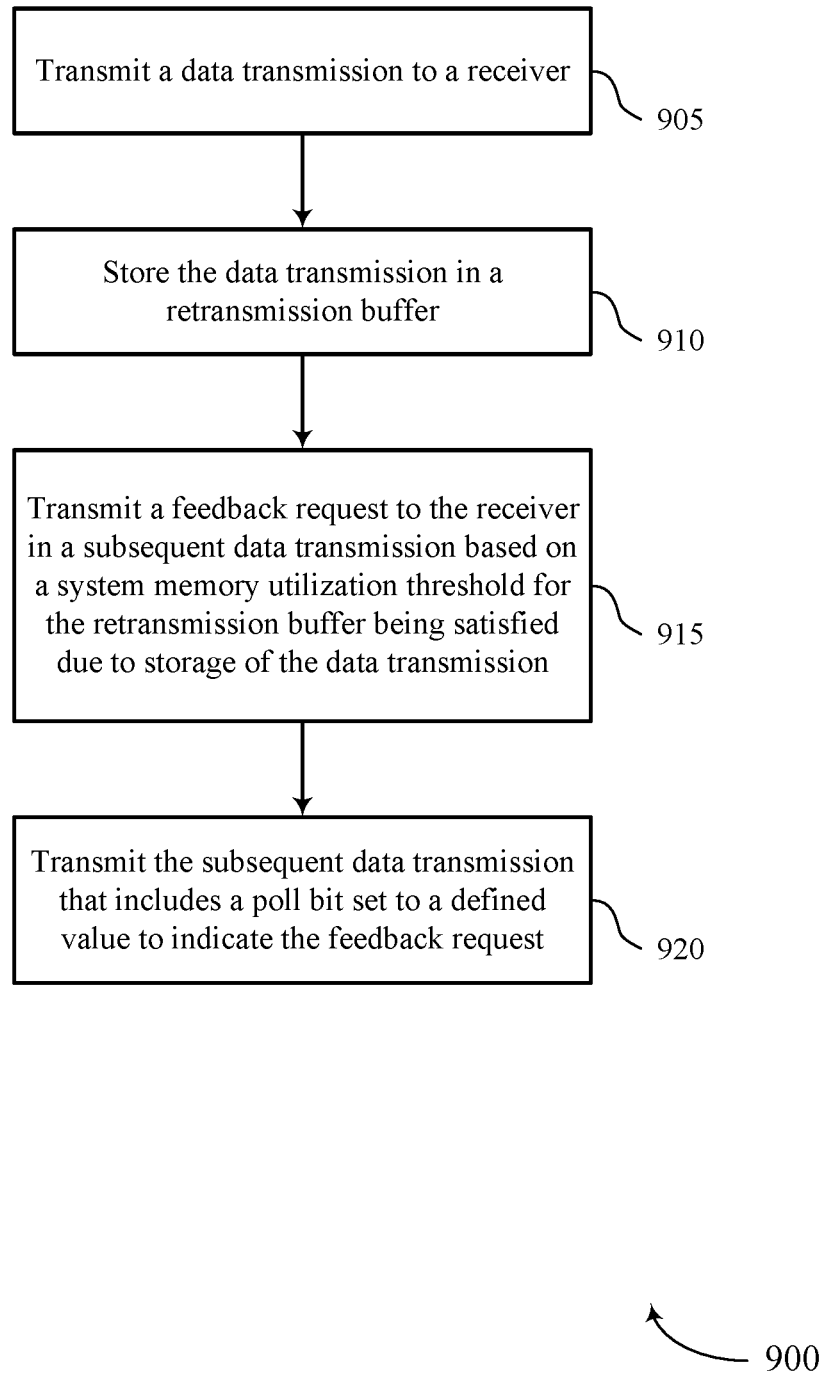
FIG. 9 shows a flowchart illustrating a method that supports system memory flow management, which includes transmitting a data transmission that includes a poll bit set to a defined value to indicate a feedback request in accordance with aspects of the present disclosure.

FIG. 9 shows a flowchart illustrating a method 900 that supports system memory flow management in accordance with aspects of the present disclosure. The operations of method 900 may be implemented by a UE 115 or its components as described herein. For example, the operations of method 900 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 905, the UE may transmit a data transmission to a receiver. The operations of 905 may be performed according to the methods described herein. In some examples, aspects of the operations of 905 may be performed by a data component as described with reference to FIGS. 4 through 7.

At 910, the UE may store the data transmission in a retransmission buffer. The operations of 910 may be performed according to the methods described herein. In some examples, aspects of the operations of 910 may be performed by a memory component as described with reference to FIGS. 4 through 7.

At 915, the UE may transmit a feedback request to the receiver in a subsequent data transmission based on a system memory utilization threshold for the retransmission buffer being satisfied due to storage of the data transmission. The operations of 915 may be performed according to the methods described herein. In some examples, aspects of the operations of 915 may be performed by a feedback component as described with reference to FIGS. 4 through 7.

At 920, the UE may transmit the subsequent data transmission that includes a poll bit set to a defined value to indicate the feedback request. The operations of 920 may be performed according to the methods described herein. In some examples, aspects of the operations of 920 may be performed by a data component as described with reference to FIGS. 4 through 7.

Figure 10:
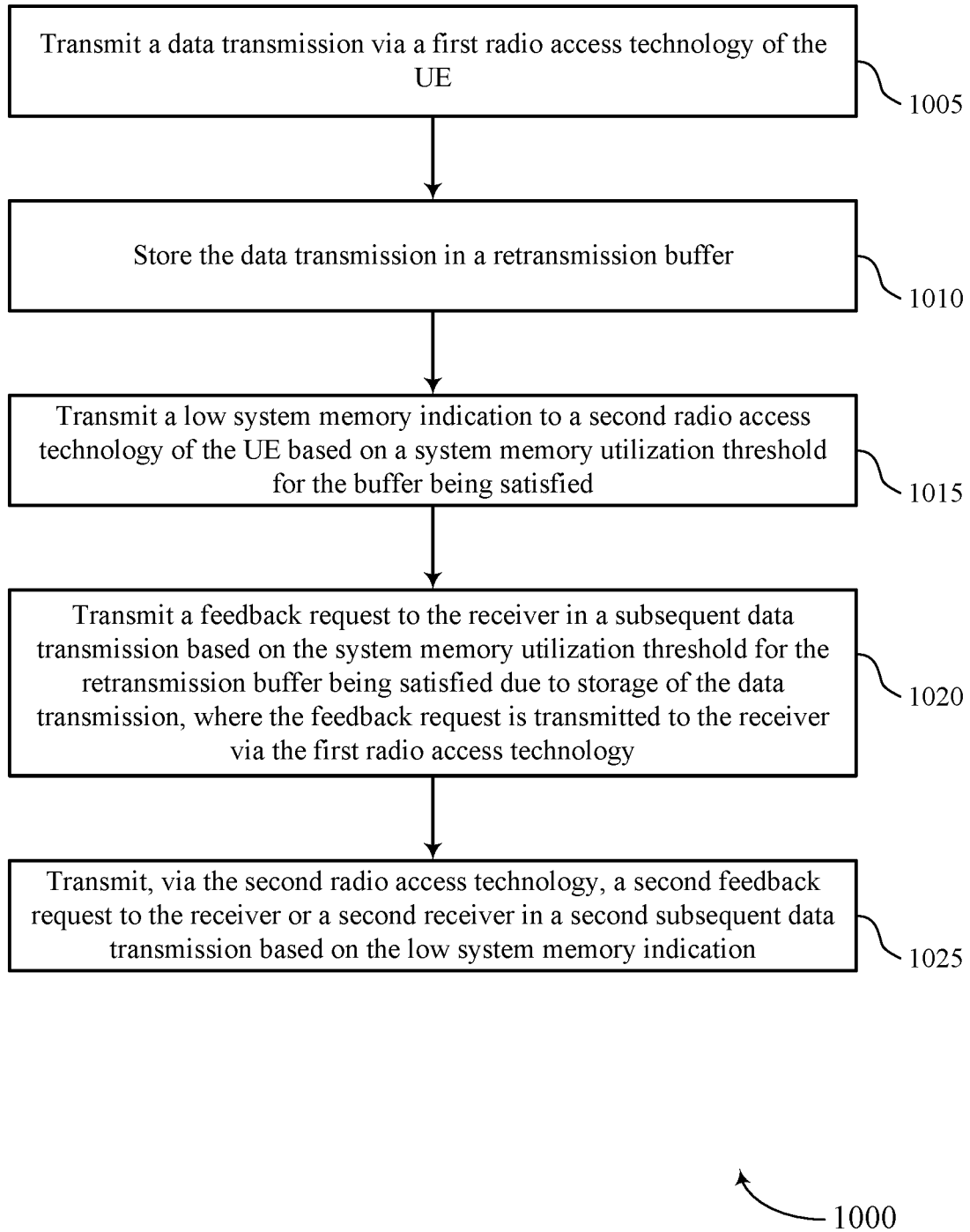
FIG. 10 shows a flowchart illustrating a method that supports system memory flow management, which includes transmitting a low system memory indication to a radio access technology based on a system memory utilization threshold in accordance with aspects of the present disclosure.

FIG. 10 shows a flowchart illustrating a method 1000 that supports system memory flow management in accordance with aspects of the present disclosure. The operations of method 1000 may be implemented by a UE 115 or its components as described herein. For example, the operations of method 1000 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1005, the UE may transmit the data transmission via a first radio access technology of the UE. The operations of 1005 may be performed according to the methods described herein. In some examples, aspects of the operations of 1005 may be performed by a data component as described with reference to FIGS. 4 through 7.

At 1010, the UE may store the data transmission in a retransmission buffer. The operations of 1010 may be performed according to the methods described herein. In some examples, aspects of the operations of 1010 may be performed by a memory component as described with reference to FIGS. 4 through 7.

At 1015, the UE may transmit a low system memory indication to a second radio access technology of the UE based on a system memory utilization threshold for the buffer being satisfied. The operations of 1015 may be performed according to the methods described herein. In some examples, aspects of the operations of 1015 may be performed by an indicator component as described with reference to FIGS. 4 through 7.

At 1020, the UE may transmit a feedback request to the receiver in a subsequent data transmission based on the system memory utilization threshold for the retransmission buffer being satisfied due to storage of the data transmission, where the feedback request is transmitted to the receiver via the first radio access technology. The operations of 1020 may be performed according to the methods described herein. In some examples, aspects of the operations of 1020 may be performed by a feedback component as described with reference to FIGS. 4 through 7.

At 1025, the UE may transmit, via the second radio access technology, a second feedback request to the receiver or a second receiver in a second subsequent data transmission based on the low system memory indication. The operations of 1025 may be performed according to the methods described herein. In some examples, aspects of the operations of 1025 may be performed by a feedback component as described with reference to FIGS. 4 through 7.

Figure 11:
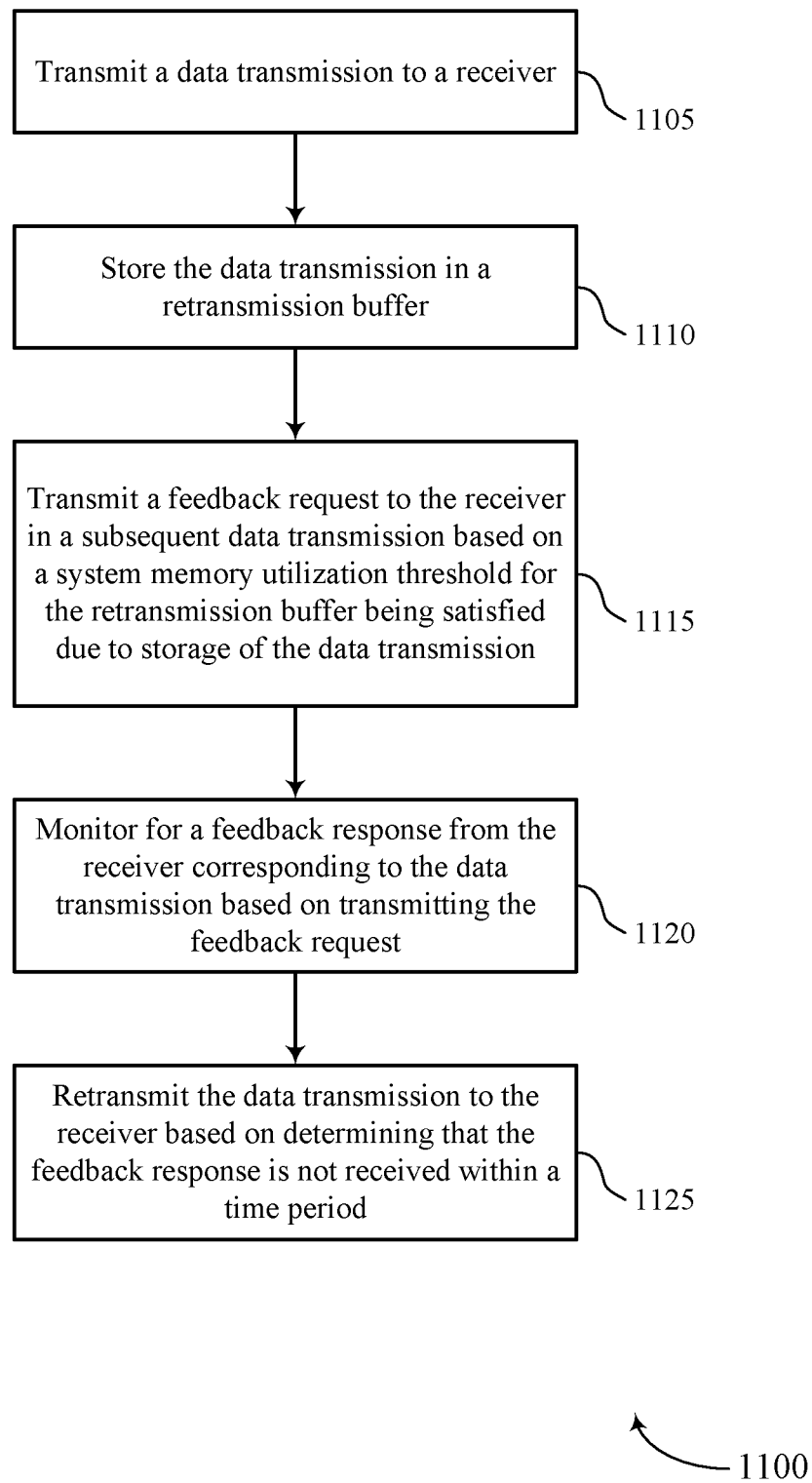
FIG. 11 shows a flowchart illustrating a method that supports system memory flow management, which includes retransmitting a data transmission to a receiver device based on determining that a feedback response is not received within a time period in accordance with aspects of the present disclosure.

FIG. 11 shows a flowchart illustrating a method 1100 that supports system memory flow management in accordance with aspects of the present disclosure. The operations of method 1100 may be implemented by a UE 115 or its components as described herein. For example, the operations of method 1100 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1105, the UE may transmit a data transmission to a receiver. The operations of 1105 may be performed according to the methods described herein. In some examples, aspects of the operations of 1105 may be performed by a data component as described with reference to FIGS. 4 through 7.

At 1110, the UE may store the data transmission in a retransmission buffer. The operations of 1110 may be performed according to the methods described herein. In some examples, aspects of the operations of 1110 may be performed by a memory component as described with reference to FIGS. 4 through 7.

At 1115, the UE may transmit a feedback request to the receiver in a subsequent data transmission based on a system memory utilization threshold for the retransmission buffer being satisfied due to storage of the data transmission. The operations of 1115 may be performed according to the methods described herein. In some examples, aspects of the operations of 1115 may be performed by a feedback component as described with reference to FIGS. 4 through 7.

At 1120, the UE may monitor for a feedback response from the receiver corresponding to the data transmission based on transmitting the feedback request. The operations of 1120 may be performed according to the methods described herein. In some examples, aspects of the operations of 1120 may be performed by a monitoring component as described with reference to FIGS. 4 through 7.

At 1125, the UE may retransmit the data transmission to the receiver based on determining that the feedback response is not received within a time period. The operations of 1125 may be performed according to the methods described herein. In some examples, aspects of the operations of 1125 may be performed by a data component as described with reference to FIGS. 4 through 7.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications by a UE, comprising: transmitting, by the UE, a data transmission to a receiver; storing the data transmission in a retransmission buffer; and transmitting a feedback request to the receiver in a subsequent data transmission based at least in part on a system memory utilization threshold for the retransmission buffer being satisfied due to storage of the data transmission.

Aspect 2: The method of aspect 1, wherein transmitting the feedback request comprises: transmitting the subsequent data transmission that includes a poll bit set to a defined value to indicate the feedback request.

Aspect 3: The method of any of aspects 1 through 2, wherein transmitting the data transmission comprises: transmitting the data transmission via a first radio access technology of the UE, wherein the feedback request is transmitted to the receiver via the first radio access technology.

Aspect 4: The method of aspect 3, further comprising: transmitting a low system memory indication to a second radio access technology of the UE based at least in part on the system memory utilization threshold for the retransmission buffer being satisfied; and transmitting, via the second radio access technology, a second feedback request to the receiver or a second receiver in a second subsequent data transmission based at least in part on the low system memory indication.

Aspect 5: The method of any of aspects 1 through 4, further comprising: monitoring for a feedback response from the receiver corresponding to the data transmission based at least in part on transmitting the feedback request.

Aspect 6: The method of aspect 5, wherein the monitoring further comprises: receiving the feedback response from the receiver; and retransmitting the data transmission to the receiver based at least in part on the feedback response.

Aspect 7: The method of any of aspects 5 through 6, wherein the monitoring further comprises: receiving the feedback response from the receiver; and removing the data transmission from the retransmission buffer based at least in part on the feedback response.

Aspect 8: The method of aspect 7, further comprising: determining not to transmit a second feedback request to the receiver in a second subsequent data transmission based at least in part on the system memory utilization threshold for the retransmission buffer not being satisfied due to removal of the data transmission from the retransmission buffer.

Aspect 9: The method of aspect 8, wherein determining not to transmit the second feedback request comprises: determining not to transmit the second feedback request in the second subsequent data transmission based at least in part on a system memory availability threshold for the retransmission buffer being satisfied due to removal of the data transmission from the retransmission buffer.

Aspect 10: The method of any of aspects 5 through 9, wherein the monitoring further comprises: retransmitting the data transmission to the receiver based at least in part on determining that the feedback response is not received within a time period.

Aspect 11: The method of any of aspects 5 through 10, wherein the feedback response indicates that the receiver successfully received the data transmission or did not successfully receive the data transmission.

Aspect 12: The method of any of aspects 1 through 11, wherein the system memory utilization threshold is less than a preconfigured window size for the retransmission buffer.

Aspect 13: The method of any of aspects 1 through 12, wherein an acknowledgement window size for a transmitter entity of the UE is based at least in part on an available memory budget of the UE.

Aspect 14: The method of aspect 13, further comprising: dynamically scaling up or down, by the transmitter entity of the UE, the acknowledgement window size based at least in part on memory usage by the UE.

Aspect 15: The method of any of aspects 13 through 14, wherein the system memory utilization threshold is less than the acknowledgement window size.

Aspect 16: The method of any of aspects 1 through 15, wherein the data transmission is a radio link control protocol data unit transmission.

Aspect 17: An apparatus for wireless communications by a UE, comprising a processor; memory coupled with the processor; and instructions stored in the memory and executable by the processor to cause the apparatus to perform a method of any of aspects 1 through 16.

Aspect 18: An apparatus for wireless communications by a UE, comprising at least one means for performing a method of any of aspects 1 through 16.

Aspect 19: A non-transitory computer-readable medium storing code for wireless communications by a UE, the code comprising instructions executable by a processor to perform a method of any of aspects 1 through 16.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, EEPROM, flash memory, CD ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications implemented by a user equipment (UE), comprising:
    transmitting, by the UE, a data message to a receiver via a first radio access technology of the UE;
    storing the data message in a retransmission buffer;
    dynamically scaling up or down, by the UE, a size of an acknowledgement window based at least in part on available memory of the UE, wherein the size of the acknowledgement window indicates a threshold quantity for data messages awaiting acknowledgement in the retransmission buffer, and wherein a system memory utilization threshold is less than the size of the acknowledgement window;
    transmitting, via the first radio access technology, a feedback request to the receiver in a subsequent data message based at least in part on the system memory utilization threshold for the retransmission buffer being satisfied due to storage of the data message; and
    transmitting a low system memory indication to a second radio access technology of the UE different from the first radio access technology based at least in part on the system memory utilization threshold for the retransmission buffer being satisfied.

2. The method of claim 1, wherein the transmitting the feedback request comprises:
    transmitting the subsequent data message that includes a poll bit set to a defined value to indicate the feedback request.

3. The method of claim 1, further comprising:
transmitting, via the second radio access technology, a second feedback request to the receiver or a second receiver in a second subsequent data message based at least in part on the low system memory indication.

4. The method of claim 1, further comprising:
monitoring for a feedback response from the receiver corresponding to the data message based at least in part on transmitting the feedback request.

5. The method of claim 4, wherein the monitoring further comprises:
receiving the feedback response from the receiver; and
retransmitting the data message to the receiver based at least in part on the feedback response.

6. The method of claim 4, wherein the monitoring further comprises:
receiving the feedback response from the receiver; and
removing the data message from the retransmission buffer based at least in part on the feedback response.

7. The method of claim 6, further comprising:
refraining from transmitting a second feedback request to the receiver in a second subsequent data message based at least in part on the system memory utilization threshold for the retransmission buffer not being satisfied due to removal of the data message from the retransmission buffer.

8. The method of claim 7, wherein the refraining from transmitting the second feedback request comprises:
refraining from transmitting the second feedback request in the second subsequent data message based at least in part on a system memory availability threshold for the retransmission buffer being satisfied due to removal of the data message from the retransmission buffer.

9. The method of claim 4, wherein the monitoring further comprises:
retransmitting the data message to the receiver based at least in part on the feedback response not being received within a time period.

10. The method of claim 4, wherein the feedback response indicates that the receiver successfully received the data message or did not successfully receive the data message.

11. The method of claim 1, wherein the system memory utilization threshold is less than a preconfigured size.

12. The method of claim 1, wherein the size of the acknowledgement window of a transmitter entity of the UE is based at least in part on the available memory of the UE.

13. The method of claim 12, wherein dynamically scaling up or down the size comprises:
dynamically scaling up or down, by a transmitter entity of the UE, the size based at least in part on memory usage by the UE.

14. The method of claim 1, wherein the data message is a radio link control protocol data unit transmission.

15. An apparatus for wireless communications at a user equipment (UE), comprising:
a processor, and
memory coupled with the processor, wherein the memory comprises instructions executable by the processor to cause the apparatus to:
transmit, by the apparatus, a data message to a receiver via a first radio access technology of the apparatus;
store the data message in a retransmission buffer;
dynamically scale up or down a size of an acknowledgement window based at least in part on available memory of the UE, wherein the size of the acknowledgement window indicates a threshold quantity for data messages awaiting acknowledgement in the retransmission buffer, and wherein a system memory utilization threshold is less than the size of the acknowledgement window;
transmit, via the first radio access technology, a feedback request to the receiver in a subsequent data message based at least in part on the system memory utilization threshold for the retransmission buffer being satisfied due to storage of the data message; and
transmit a low system memory indication to a second radio access technology of the apparatus different from the first radio access technology based at least in part on the system memory utilization threshold for the retransmission buffer being satisfied.

16. The apparatus of claim 15, wherein the instructions to transmit the feedback request are executable by the processor to cause the apparatus to:
transmit the subsequent data message that includes a poll bit set to a defined value to indicate the feedback request.

17. The apparatus of claim 15, wherein the instructions are further executable by the processor to cause the apparatus to:
transmit, via the second radio access technology, a second feedback request to the receiver or a second receiver in a second subsequent data message based at least in part on the low system memory indication.

18. The apparatus of claim 15, wherein the instructions are further executable by the processor to cause the apparatus to:
monitor for a feedback response from the receiver corresponding to the data message based at least in part on transmitting the feedback request.

19. The apparatus of claim 18, wherein the instructions to monitor are executable by the processor to cause the apparatus to:
receive the feedback response from the receiver; and
retransmit the data message to the receiver based at least in part on the feedback response.

20. The apparatus of claim 18, wherein the instructions to monitor are executable by the processor to cause the apparatus to:
receive the feedback response from the receiver; and
remove the data message from the retransmission buffer based at least in part on the feedback response.

21. The apparatus of claim 20, wherein the instructions are further executable by the processor to cause the apparatus to:
refrain from transmitting a second feedback request to the receiver in a second subsequent data message based at least in part on the system memory utilization threshold for the retransmission buffer not being satisfied due to removal of the data message from the retransmission buffer.

22. The apparatus of claim 21, wherein the instructions to refrain from transmitting the second feedback request are executable by the processor to cause the apparatus to:
refrain from transmitting the second feedback request in the second subsequent data message based at least in part on a system memory availability threshold for the retransmission buffer being satisfied due to removal of the data message from the retransmission buffer.

23. The apparatus of claim 18, wherein the instructions to monitor are executable by the processor to cause the apparatus to:

retransmit the data message to the receiver based at least in part on the feedback response not being received within a time period.

24. The apparatus of claim 18, wherein the feedback response indicates that the receiver successfully received the data message or did not successfully receive the data message.

25. The apparatus of claim 15, wherein the system memory utilization threshold is less than a preconfigured size.

26. An apparatus for wireless communications at a user equipment (UE), comprising:
- means for transmitting, by the apparatus, a data message to a receiver via a first radio access technology of the apparatus;
- means for storing the data message in a retransmission buffer;
- means for dynamically scaling up or down, by the UE, a size of an acknowledgement window based at least in part on available memory of the UE, wherein the size of the acknowledgement window indicates a threshold quantity for data messages awaiting acknowledgement in the retransmission buffer, and wherein a system memory utilization threshold is less than the size of the acknowledgement window;
- means for transmitting, via the first radio access technology, a feedback request to the receiver in a subsequent data message based at least in part on the system memory utilization threshold for the retransmission buffer being satisfied due to storage of the data message; and
- means for transmitting a low system memory indication to a second radio access technology of the apparatus different from the first radio access technology based at least in part on the system memory utilization threshold for the retransmission buffer being satisfied.

27. A non-transitory computer-readable medium storing code for wireless communications by a user equipment (UE), the code comprising instructions executable by a processor to:
- transmit, by the UE, a data message to a receiver via a first radio access technology of the UE;
- store the data message in a retransmission buffer;
- dynamically scaling up or down, by the UE, a size of an acknowledgement window based at least in part on available memory of the UE, wherein the size of the acknowledgement window indicates a threshold quantity for data messages awaiting acknowledgement in the retransmission buffer, and wherein a system memory utilization threshold is less than the size of the acknowledgement window;
- transmit, via the first radio access technology, a feedback request to the receiver in a subsequent data message based at least in part on the system memory utilization threshold for the retransmission buffer being satisfied due to storage of the data message; and
- transmit a low system memory indication to a second radio access technology of the UE different from the first radio access technology based at least in part on the system memory utilization threshold for the retransmission buffer being satisfied.

* * * * *